(12) United States Patent
Smook et al.

(10) Patent No.: US 9,018,789 B2
(45) Date of Patent: Apr. 28, 2015

(54) DRIVE TRAIN FOR A WIND TURBINE

(71) Applicant: ZF Wind Power Antwerpen N.V., Lommel (BE)

(72) Inventors: Warren Smook, Huldenberg (BE); Gerhard Diekhans, Bocholt (DE)

(73) Assignee: ZF Wind Power Antwerpen N.V., Lommel (BE)

( * ) Notice: Subject to any disclaimer, the term of this patent is extended or adjusted under 35 U.S.C. 154(b) by 196 days.

(21) Appl. No.: 13/744,692

(22) Filed: Jan. 18, 2013

(65) Prior Publication Data

US 2013/0187390 A1    Jul. 25, 2013

(30) Foreign Application Priority Data

Jan. 20, 2012    (EP) .................................... 12151855

(51) Int. Cl.
| | |
|---|---|
| F03D 11/00 | (2006.01) |
| F03D 9/00 | (2006.01) |
| F03D 11/02 | (2006.01) |
| F03D 7/02 | (2006.01) |

(52) U.S. Cl.
CPC .............. *F03D 11/005* (2013.01); *F03D 9/002* (2013.01); *F03D 11/02* (2013.01); *Y02E 10/722* (2013.01); *Y02E 10/725* (2013.01); *F03D 7/0248* (2013.01); *F05B 2260/902* (2013.01)

(58) Field of Classification Search
CPC ....... F03D 9/002; F03D 11/02; F03D 11/005; F03D 7/0248; Y02E 10/722; Y02E 10/725
USPC .................................................... 290/44, 55
See application file for complete search history.

(56) References Cited

U.S. PATENT DOCUMENTS

| | | | |
|---|---|---|---|
| 7,815,536 B2 | 10/2010 | Jansen et al. | |
| 2010/0133854 A1* | 6/2010 | Jansen et al. | ................. 290/1 C |
| 2011/0068583 A1 | 3/2011 | Burkart | |
| 2012/0133154 A1* | 5/2012 | Minadeo et al. | ............. 290/1 C |
| 2012/0141270 A1* | 6/2012 | Minadeo et al. | .................. 416/1 |

FOREIGN PATENT DOCUMENTS

| | | |
|---|---|---|
| CN | 101363407 A | 2/2009 |
| GB | 2 405 455 A | 3/2005 |
| WO | 2010/027618 A2 | 3/2010 |

OTHER PUBLICATIONS

European Search Report Corresponding to 12151855.9.

* cited by examiner

*Primary Examiner* — Tulsidas C Patel
*Assistant Examiner* — Viet Nguyen
(74) *Attorney, Agent, or Firm* — Davis & Bujold, PLLC; Michael J. Bujold

(57) ABSTRACT

A wind turbine drive train (1) comprising a gearbox (2), a generator (3) and a coupling (4) located between an output shaft (5) and a rotor shaft (6). The gearbox and the generator are separate components which have their own housings (7, 8). The output and rotor shafts are respectively supported by a shaft bearing arrangement (15) and a generator rotor shaft bearing arrangement (18a, 18b). The generator housing is directly connected to the gearbox housing. The drive train further comprises a gearbox output module (14), which comprises the output shaft, the shaft bearing arrangement and an output shaft bearing housing (16). The gearbox output module at least partly extends into the generator and the gearbox output module at least partly extends beyond a plane (P) defined by the generator. The coupling extends through the rotor shaft and is coupled, on a generator side (G), to the generator rotor shaft.

17 Claims, 4 Drawing Sheets

DRIVE TRAIN FOR A WIND TURBINE

This application claims priority from European patent application serial no. 12 151 855.9 filed Jan. 20, 2012.

TECHNICAL FIELD OF THE INVENTION

The present invention relates to a drive train for a wind turbine. More particularly the present invention relates to a drive train comprising a gearbox and a generator and a coupling in between the gearbox and the generator.

BACKGROUND OF THE INVENTION

The wind turbine market is changing fast nowadays. There is a continuing demand for larger wind turbines being able to generate a higher number of megawatts of electricity, also referred to as multi-megawatt wind turbines. At the same time the requirements for reduction of size and weight of the turbines and their components becomes more and more important.

In wind turbines, typically a wind turbine rotor drives a low speed shaft of a gear transmission unit or gearbox, which transforms torque and speed of the rotor to the required torque and speed of an electrical generator. The increasing demand for multi-megawatt wind turbines puts a challenging pressure on new designs of components, especially of drive trains, for such wind turbines. This is because weight and cost of the wind turbine are to be kept as low as possible or at least within acceptable ranges, while at the same time it has to be made sure that the components can withstand high rotor loads being generated during operation of the wind turbine.

Furthermore, another important issue to take into account is serviceability. Servicing, e.g. maintenance or component replacement of wind turbine drive train components such as a gearbox and/or generator, is in many cases a difficult and expensive activity, especially for offshore wind turbines. Therefore, wind turbine designs should not only be reliable in order to limit servicing activities, but should also be service friendly such that servicing, when necessary, can be performed easily and at low cost.

Hence, requirements of the wind market today are heading towards more compact designs which are still easy to service.

Conventionally known designs are built as a serial connection of a gearbox, a coupling and a generator, the one behind the other. An advantage of such conventional designs is that enough space is provided for servicing and maintenance of the different components. However, a major drawback of these conventional designs is their high length. This significantly increases the size of the nacelle, which makes the nacelle heavier and increases the cost of the nacelle.

U.S. Pat. No. 7,815,536 describes a drive train for a wind turbine. The wind turbine includes a rotor connected to a low speed shaft which in turn is connected to a gearbox. The gearbox, which is a compound planetary gearbox, has a high speed shaft connected to a generator. The gearbox housing is connected to a generator stator housing. The sun pinion shaft is used as the mechanical input to the generator. The drive train includes a bearing interposed between the gearbox and the generator, by which the generator bearings are fully contained within the gearbox, thereby sharing lubrication and cooling of the gearbox system.

The drive train described in U.S. Pat. No. 7,815,536 is of a compact design. This may reduce the required size of the nacelle, which may lead to a lighter nacelle design. However, a drawback of this drive train is that the gearbox and the generator are both supported by the same bearings or bearing arrangement, and that thus the gearbox and the generator are not formed as two separate or independent entities. This makes servicing and maintenance more difficult and time consuming, and hence increases costs of such servicing and maintenance. There is thus a high demand for more compact designs but which are still easy to service.

Furthermore, the gearbox and generator not being formed as independent entities makes testing of the gearbox and generator more complicated as they cannot be tested separately. This is because test benches are in most cases suitable for gearboxes or for generators. When gearbox and generator have to be tested while being connected together, such test benches might require adjustment so as to be able to perform such testing.

SUMMARY OF THE INVENTION

The present invention provides a drive train for a wind turbine. The drive train comprises a gearbox, a generator and a coupling in between an output shaft of the gearbox and a rotor shaft of the generator. The gearbox and the generator are independent and separate components, whereby the gearbox and the generator each have their own housing and the output shaft of the gearbox and the rotor shaft of the generator are respectively supported by a gearbox output shaft bearing arrangement and a generator rotor shaft bearing arrangement. Hereby the gearbox output shaft bearing arrangement and the generator rotor shaft bearing arrangement are formed by two different bearing arrangements. In other words, the gearbox output shaft and the generator rotor shaft each have their own bearing arrangement. A consequence of the gearbox and the generator being separate components or entities is that both the gearbox and the generator can each separately be tested. The housing of the generator is directly connected to the housing of the gearbox, for example by a bolted connection. Furthermore, a gearbox output module, which comprises the gearbox output shaft, the gearbox output shaft bearing arrangement and an output shaft bearing housing, at least partly extends into the generator, whereby the gearbox output module at least partly extends beyond a plane defined by an axial surface of a rotating part of the generator that is first encountered in a direction going from gearbox to generator. Moreover, the coupling extends through a centre of the rotor shaft of the generator and is coupled to the generator rotor shaft at a generator side of the drive train.

With generator side of the drive train is meant that side of the drive train opposite to the rotor side of the drive train which is intended to be connected to a rotor of a wind turbine. The generator side of the drive train indicates that side of the generator opposite to the side of the generator that is connected to the gearbox. The generator side may also be referred to as non-rotor side of the drive train.

With the housing of the generator being directly connected to the housing of the gearbox is meant that no other gearbox or generator parts are present in between the gearbox housing and the generator housing at their connection. It has to be understood that means for e.g. reducing vibrations or any other means required between the gearbox housing and the generator housing for avoiding negative influences acting on the drive train, such as e.g. rubber rings or rubber parts, are not considered as gearbox or generator parts. Hence, when such means are present in between the gearbox housing and the generator housing, this is still considered as a direct connection between the gearbox housing and the generator housing.

The gearbox may have a coaxial design. For example, the gearbox may comprise at least one planetary gear stage or may comprise at least one differential gear stage or may be any other gearbox with a coaxial design as known by a person skilled in the art.

According to embodiments of the invention, the generator may be any suitable generator as known by a person skilled in the art.

An advantage of a drive train according to embodiments of the invention is that it is very compact. This is because at least part of the output module and the coupling extend within the generator.

The generator comprises a rotor and a stator, the rotor comprising a rotor shaft and a structure carrying active elements. According to embodiments of the invention, the axial surface of a rotating part of the generator that is first encountered is formed by a front surface of the structure that carries the active elements.

According to such embodiments, the gearbox output module may at least partly extend into a cavity in the generator housing. The cavity may have a dimension in axial direction, a first diameter and a second diameter, the first diameter being equal to or smaller than the second diameter and being larger than an end of the output module closest to the generator, and the second diameter being larger than the largest diameter of the part of the gearbox output module extending into the generator. Hence, in other words, according to such embodiments the shape of the generator housing is such that the part of the gearbox output module extending into the generator fits into it. The generator housing may also be referred to as generator stator housing. Further according to these embodiments, the rotor shaft of the generator may be located at a distance equal to the axial dimension from the location where the gearbox housing is connected to the generator housing. Furthermore, a first rotor shaft bearing may be located at a side of the generator rotor shaft closest to the gearbox and a second rotor shaft bearing may be located at a side of the generator rotor shaft closest to an end of the generator furthest away from the gearbox.

According to embodiments of the invention, the rotor shaft may have an inner diameter and the coupling may be connected to the gearbox output shaft via a flange having an outer diameter which is smaller than the inner diameter of the rotor shaft.

According to other embodiments of the invention, the rotor shaft may have an inner diameter and the coupling may be connected to the gearbox output shaft via a flange having an outer diameter which is larger than the inner diameter of the rotor shaft.

According to further embodiments of the invention, the axial surface of a rotating part of the generator that is first encountered is formed by a front surface of the generator rotor shaft. Hence, according to such embodiments the shape of the generator rotor shaft may be such that the part of the gearbox output module extending into the generator fits into it.

According to particular embodiments, the inner diameter of the generator rotor shaft may be larger than the largest diameter of the part of the gearbox output module extending into the generator. In that way, the gearbox output module can at least partly extend into the generator rotor shaft. According to such embodiments, a first rotor shaft bearing may be located at a side of the rotor shaft closest to the gearbox and a second rotor shaft bearing may be located at a side of the rotor shaft closest to an end of the generator furthest away from the gearbox.

According to other particular embodiments, the generator rotor shaft may have a first part with a first diameter at an end of the generator closest to the gearbox and a second part with a second diameter at an end of the generator furthest away from the gearbox, the first diameter being larger than the second diameter and being larger than the largest diameter of the part of the gearbox output module extending into the generator. According to such embodiments, a first rotor shaft bearing may be located at the first part of the rotor shaft and a second rotor shaft bearing may be located at the second part of the rotor shaft.

According to embodiments of the invention, the coupling may be hollow and may be connected to the gearbox output module with e.g. a bolted connection that is accessible from the inside of the coupling. An advantage hereof is that in that way the coupling may be completely demountable from the drive train while the gearbox and generator are connected together by their housings, i.e. when the gearbox and generator are in place. With completely demountable is meant that the coupling as a whole can be removed from the drive train without first having to disconnect and remove the generator from the gearbox by disconnecting their housings. An advantage hereof is that the drive train is easy to maintain.

The coupling may be formed of an electrically insulating material. In that way, rotor and stator of the generator are isolated from rest of the drive train, or in other words, from the gearbox. Hence, no electrical transfer, i.e. transfer of stray current, occurs from the generator to the gearbox.

According to embodiments of the invention, the drive train may furthermore comprise a brake assembly comprising a brake disc and callipers. The brake disc of the brake assembly may be fixed to an end of the coupling furthest away from the generator and the callipers may be fixed to a static part of the generator housing.

BRIEF DESCRIPTION OF THE DRAWINGS

It has to be noted that same reference signs in the different figures refer to same, similar or analogous elements.

DETAILED DESCRIPTION OF THE PREFERRED EMBODIMENTS

Figure 1:
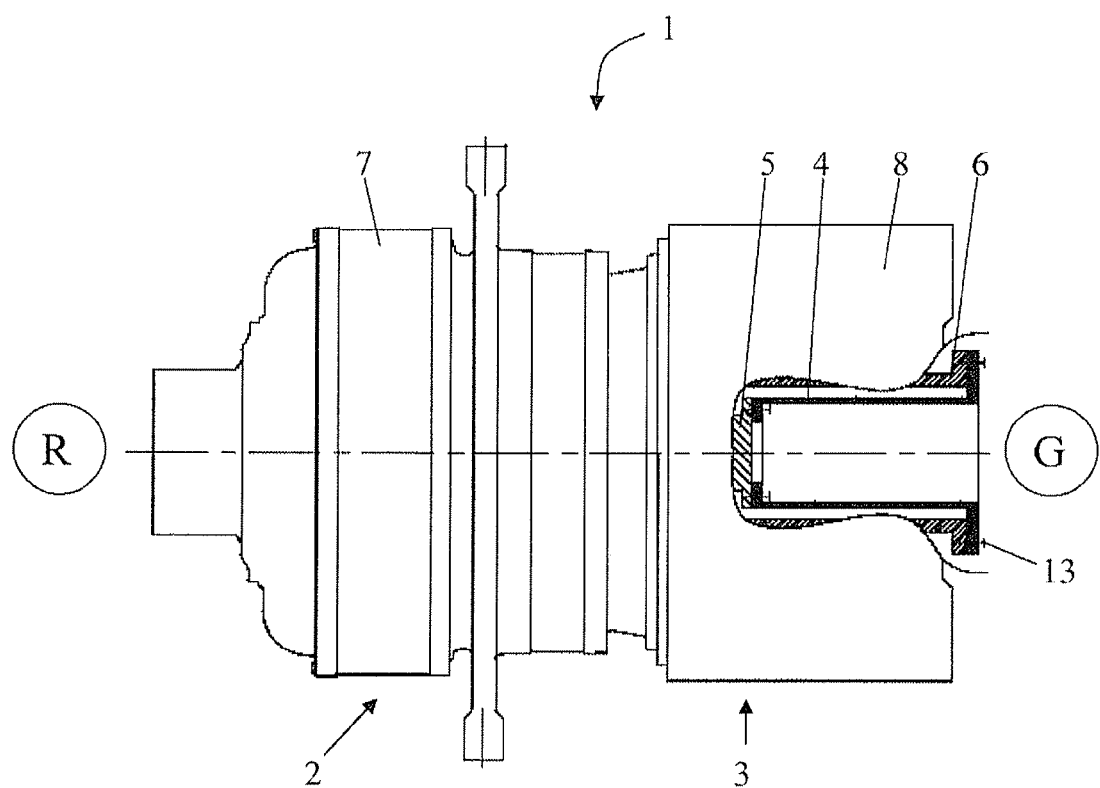
FIG. 1, FIG. 2a and FIG. 2b schematically illustrate the principle concept of a drive train according to embodiments of the invention.

In the description different embodiments will be used to describe the invention. Therefore reference will be made to different drawings. It has to be understood that these drawings are intended to be non-limiting, the invention is only limited by the claims. The drawings are thus for illustrative purposes, the size of some of the elements in the drawings may be exaggerated for clarity purposes.

The term "comprising" is not to be interpreted as limiting the invention in any way. The term "comprising", used in the claims, is not intended to be restricted to what means is described thereafter; it does not exclude other elements, parts or steps.

The term "connected" as used in the claims and in the description has not to be interpreted as being restricted to direct connections, unless otherwise specified. Thus, part A being connected to part B is not limited to part A being in direct contact to part B, but also includes indirect contact between part A and part B, in other words also includes the case where intermediate parts are present in between part A and part B.

Not all embodiments of the invention comprise all features of the invention. In the following description and claims, any of the claimed embodiments can be used in any combination.

The present invention provides a drive train for a wind turbine. The drive train comprises a gearbox, a generator and a coupling in between an output shaft of the gearbox and a rotor shaft of the generator. The gearbox and the generator are independent and separate components. This means that the gearbox and the generator each have their own housing and each have their own bearing arrangement. With the gearbox and the generator each having their own bearing arrangement is meant that the output shaft of the gearbox and the rotor shaft of the generator are respectively supported by a gearbox output shaft bearing arrangement and a generator rotor shaft bearing arrangement, whereby the gearbox output shaft bearing arrangement and the generator rotor shaft bearing arrangement are formed by different bearing arrangements, also referred to as bearing sets or bearing assemblies. Furthermore, the housing of the generator is directly connected to the housing of the gearbox, for example by a bolted connection.

A gearbox output module, which comprises the gearbox output shaft, the gearbox output shaft bearing arrangement and an output shaft bearing housing, at least partly extends into the generator, whereby the gearbox output module at least partly extends beyond a plane defined by an axial surface of a rotating part of the generator that is first encountered in a direction going from gearbox to generator. Moreover, the coupling extends through a centre of the rotor shaft of the generator and is coupled to the generator rotor shaft at a generator side of the drive train.

The novel and inventive concept of a drive train according to embodiments of the invention lies in the combination of the gearbox and the generator being separate entities, the generator housing being directly connected to the gearbox housing, the gearbox output module at least partly extending beyond a plane defined by an axial surface of a rotating part of the generator that is first encountered in a direction going from gearbox to generator and the coupling extending through the generator and being coupled to the rotor of the generator at the backside, i.e. the generator side, of drive train. It is acknowledged that some of the above properties may separately be known from other gearbox designs. However, the novel and inventive concept lies in the specific combination of such properties as set out above.

An advantage of a drive train according to embodiments of the invention is that it is very compact. This is because at least part of the output module and the coupling extend within the generator. Moreover, while being very compact, a drive train according to embodiments of the invention is easy to maintain and service, as the gearbox and the generator are formed as separate entities, which makes it possible to service these components separately and independent from each other. Furthermore, in a drive train having a design according to some embodiments of the invention, the coupling can be removed from the drive train without having to disconnect the generator from the gearbox, which can save a considerable amount of time and consequently can significantly decrease costs for servicing or replacing the coupling from the drive train.

FIG. 1 schematically illustrates the principle of a drive train 1 according to embodiments of the present invention. The drive train 1 comprises a gearbox 2 and a generator 3 and a coupling 4 between a gearbox output shaft 5 and a generator rotor shaft 6. The gearbox 2 and the generator 3 are separate entities. This means that each of the gearbox 2 and the generator 3 has its own housing, respectively gearbox housing 7 and generator housing 8 and each has its own bearing arrangement (see further). The housing 8 of the generator 3 is directly connected to the housing 7 of the gearbox 2, e.g. by means of a bolted connection (not shown in FIG. 1, see further). With the housing 8 of the generator 3 being directly connected to the housing 7 of the gearbox 2 is meant that no other gearbox parts or generator parts are present in between the gearbox housing 7 and the generator housing 8 at their connection. It has to be understood that means for e.g. reducing vibrations or any other means required between the gearbox housing 7 and the generator housing 8 for avoiding negative influences acting on the drive train 1, such as e.g. rubber rings or rubber parts, are not considered as gearbox or generator parts. Hence, when such means are present in between the gearbox housing 7 and the generator housing 8, this is still considered as the gearbox housing 7 and the generator housing 8 being directly connected to each other.

Figures 2A, 2B:
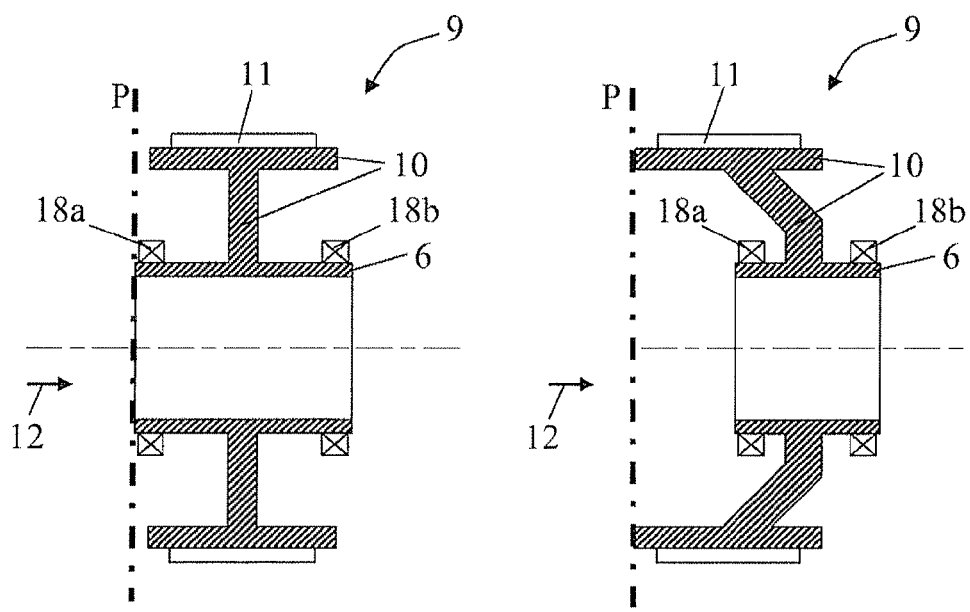

The gearbox 2 furthermore has a gearbox output module comprising the gearbox output shaft 5, gearbox output shaft bearing arrangement and an output shaft bearing housing (see further). The gearbox output module at least partly extends into the generator 3, whereby the gearbox output module at least partly extends beyond a plane defined by an axial surface of a rotating part of the generator 3 that is first encountered in a direction going from the gearbox 2 to the generator 3. In other words, the gearbox output module extends beyond the axial plane defined by a front surface of the first rotating part of the generator 3, for example the first rotating part of the generator rotor 9. This is illustrated in FIG. 2a and FIG. 2b which show the rotor 9 of the generator 3. With the term generator rotor 9 is meant the structure of the generator 3 comprising the rotor shaft 6, a structure 10 for carrying the active elements 11 such as e.g. electromagnets or permanent magnets, and the active elements 11 themselves. FIG. 2a shows a first implementation. In this example the plane P is defined by a front surface of the rotor shaft 6 of the generator rotor 9. As can be seen from the figure, the generator rotor shaft 6 is the first rotating part of the generator 3 that is encountered when going in a direction from the gearbox 2 towards the generator 3 (indicated by arrow 12 in FIG. 2a). FIG. 2b shows another implementation. In this second example the plane P is defined by a front surface of the structure 10 carrying the active elements 11 of the generator 3. Indeed, when going in a direction from the gearbox 2 to the generator 3 (indicated by arrow 12), the structure 10 carrying the active elements 11 is the first rotating part of the generator 3 that is encountered.

As already described above, a coupling 4 is present in between the gearbox output shaft 5 and the generator rotor shaft 6. The coupling 4 extends through a centre of the generator rotor shaft 6 and is coupled to the generator rotor shaft 6 at a generator side G of the drive train 1. The coupling 4 may be fixed to the generator rotor shaft 6 by means of e.g. bolts 13. As is illustrated in FIG. 1, with generator side G is meant the side of the drive train 1 opposite to the rotor side R of the drive train 1 which is intended to connect the drive train 1 to a rotor of a wind turbine. The generator side G of the drive train 1 indicates that side of the generator 3 opposite to the side of the generator 3 that is connected to the gearbox 2. The generator side G may also be referred to as non-rotor side.

The present invention will hereinafter be described by means of different embodiments. It has to be understood that these embodiments are only for the ease of understanding the invention and are not intended to limit the invention in any way.

Figure 3:
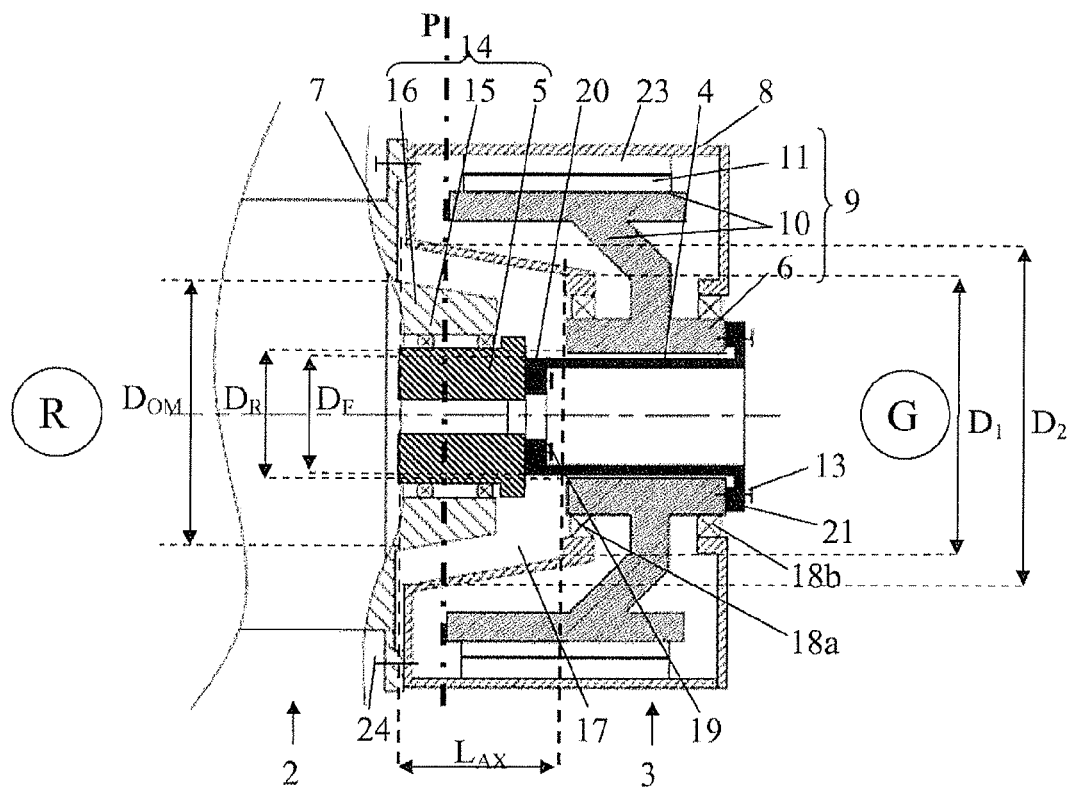
FIG. 3 to FIG. 7 illustrates part of a drive train according to different embodiments of the invention

FIG. 3 schematically illustrates a first embodiment of a drive train 1 according to the present invention. According to this embodiment, the gearbox output module 14 comprising the gearbox output shaft 5, gearbox output shaft bearing arrangement 15 and gearbox output shaft bearing housing 16, may at least partly extend into a cavity 17 in the generator housing 8. Therefore, the cavity 17 may have a dimension $L_{AX}$ in axial direction, also referred to as the length $L_{AX}$ of the cavity 17. The length $L_{AX}$ of the cavity 17 is the maximum distance over which the gearbox output module 14 can extend into the generator 3. The cavity 17 furthermore has a first diameter $D_1$ and a second diameter $D_2$. In the example given, the first diameter $D_1$ is smaller than the second diameter $D_2$. In other words, in the example given, the cavity 17 has a conical shape. However, according to other embodiments, the first diameter $D_1$ may be equal to the second diameter $D_2$ or, in other words, the cavity 17 may have a cylindrical shape. Similar and because the gearbox output module 14 is intended to fit into the cavity 17 in the generator housing 8, the gearbox output module 14 may have a conical shape or may have a cylindrical shape. Furthermore, the first diameter $D_1$ of the cavity 17 may be larger than an end of the gearbox output module 14 closest to the generator 3 and the second diameter $D_2$ may be larger than the largest diameter $D_{OM}$ of the part of the gearbox output module 14 extending into the generator 3. According to these embodiments, the rotor shaft 6 of the generator 3 is, with respect to conventionally known drive trains, shifted away from the gearbox 2 over a distance which is smaller than or equal to $L_{AX}$ from the location where the gearbox housing 7 is connected to the generator housing 8. In other words, with respect to conventional generator designs where the rotor shaft extends over the full length of the generator, according to the present embodiment of the invention, the generator rotor shaft 6 may be shifted over a distance smaller than or equal to $L_{AX}$ towards the generator side G of the drive train 1, or in other words, may be shifted over a distance smaller than or equal to $L_{AX}$ in a direction away from the gearbox 2. Furthermore, the generator rotor shaft 6 may, according to the present embodiment, be made shorter compared to conventional generator designs.

In the present embodiment, a rotor shaft bearing 18a may be located at a first end of the generator rotor shaft 6 closest to the gearbox 2 and another rotor shaft bearing 18b may be located at a second end of the generator shaft 6 furthest away from the gearbox 2.

The gearbox output shaft 5 is coupled to the generator rotor shaft 6 via coupling 4. The coupling 4 extends all the way through the generator rotor shaft 6 and is at one side fixed to the gearbox output shaft 5 by means of a flange 20. In the example given, the flange 20 may have an outer diameter $D_E$ which is smaller than the inner diameter $D_R$ of the generator rotor shaft 6. The flange 20 may be connected to the gearbox output shaft 5 via, for example, a bolted connection 19. At the other side, the coupling 4 is fixed to the generator rotor shaft 5 by means of a flange 21 that is integrally formed with the coupling 4. The flange 21 may be fixed to the generator rotor shaft 6 via, for example, bolted connection 13.

As illustrated in FIG. 3, the coupling 4 may be hollow and may have a diameter such that it fits into the rotor shaft 6 of the generator 3. Hence, the bolts 19 which connect the coupling 4 to the gearbox output shaft 5 are accessible from the inside of the coupling 4. An advantage hereof is that the coupling 4 can be removed from the drive train 1 without having to disconnect the generator 3 from the gearbox 2 and remove it. Hence, the coupling 4 is completely demountable from the drive train 1 while the gearbox 2 and generator 3 are connected together by their housings 7, 8. With completely demountable is meant that the coupling 4 as a whole can be removed from the drive train 1 without first having to disconnect and remove the generator 3 from the gearbox 2 by disconnecting their housings 7, 8.

As known by a person skilled in the art, the generator 3 may furthermore comprise a stator 23 which may be fixed to the generator housing 8.

Figure 4:
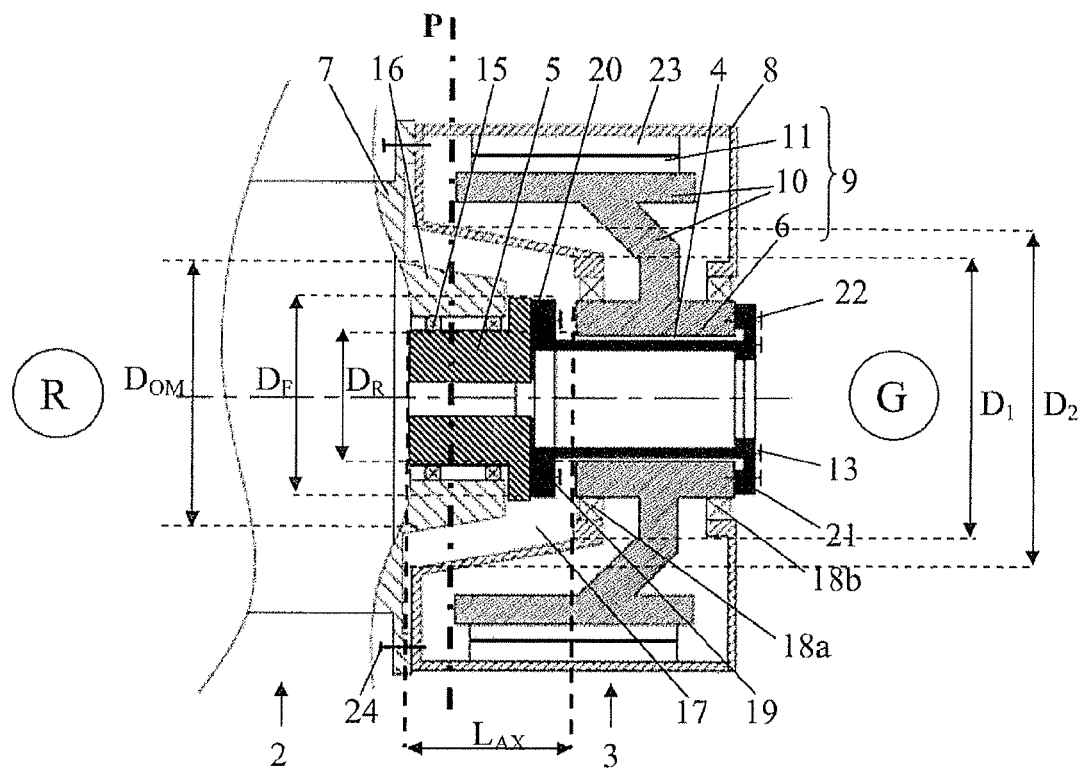

Another implementation of a drive train 1 according to the first embodiment is illustrated in FIG. 4. This implementation is similar to the one illustrated in FIG. 3 but has some differences with respect to the shape of the coupling 4. One difference with the embodiment of FIG. 3 is that the flange 20 which the coupling 4 is connected to the gearbox 2 with, may have an outer diameter $D_F$ which is larger than the inner diameter $D_R$ of the rotor shaft 6 of the generator 3. The flange 20 of the coupling 4 is connected to the gearbox output shaft 5 by means of bolted connection 19. Furthermore, according to the present embodiment, the flange 21 for connecting the coupling 4 to the generator rotor shaft 6 which is located at the side of the coupling 4 furthest away from the gearbox 2 may be formed as a separate flange 21. This separate flange 21 may be connected to the coupling 4 by means of e.g. a bolted connection 22. The flange 21 is then furthermore connected to the rotor shaft 6 of the generator 3 by means of e.g. a bolted connection 13.

As known by a person skilled in the art, the generator 3 may furthermore comprise a stator 23 which may be fixed to the generator housing 8.

In the implementations of the first embodiment described above, the gearbox 2 and generator 3 are formed as separate entities. This means that the gearbox 2 and the generator 3 each have their own housing 7, 8. The generator housing 8 is directly connected to the gearbox housing 7. This may, for example, be done by means of bolted connection 24. Furthermore, this means that the gearbox output shaft 5 and the generator rotor shaft 6 each have their own bearing arrangement, respectively gearbox output shaft bearing arrangement 15 and generator rotor shaft bearing arrangement 18a, 18b. According to embodiments of the invention, the gearbox output shaft bearing arrangement 15 and generator rotor shaft bearing arrangement 18a, 18b may comprise any suitable bearing arrangement as known by a person skilled in the art.

Furthermore, in both implementations of the first embodiment described above the gearbox output module 14 extends into the generator 3 whereby this gearbox output module 14 partly extends beyond plane P defined by an axial surface of a rotating part of the generator 3 first encountered in a direction going from the gearbox 2 towards the generator 3 (as indicated by arrow 12 in FIG. 2a and FIG. 2b). In the embodiments illustrated in FIG. 3 and FIG. 4, the plane P is defined by the front surface of the structure 10 of the generator rotor 9 that carries the active elements 11, which is the first rotating part of the generator 3 that is encountered when going in the direction from gearbox 2 towards the generator 3.

In the examples illustrated in FIG. 3 and FIG. 4, the gearbox housing 7 and the output shaft bearing housing 16 are formed as one piece. However, according to other embodiments of the invention, the gearbox housing 7 and the output shaft bearing housing 16 may also be formed as different pieces.

According to embodiments of the invention, the coupling 4 may be formed of an insulating material. The insulating material may be any suitable material known by a person skilled in the art. An advantage of the coupling 4 being formed of an insulating material is that the rotor 9 and stator 23 of the generator 3 is isolated from the rest of the drive train 1, or in other words from the gearbox 2. In that way, stray current from are short-cut by the gearbox and thus no electrical transfer occurs between the generator 3 and the rest of the drive train 1.

Figure 5:
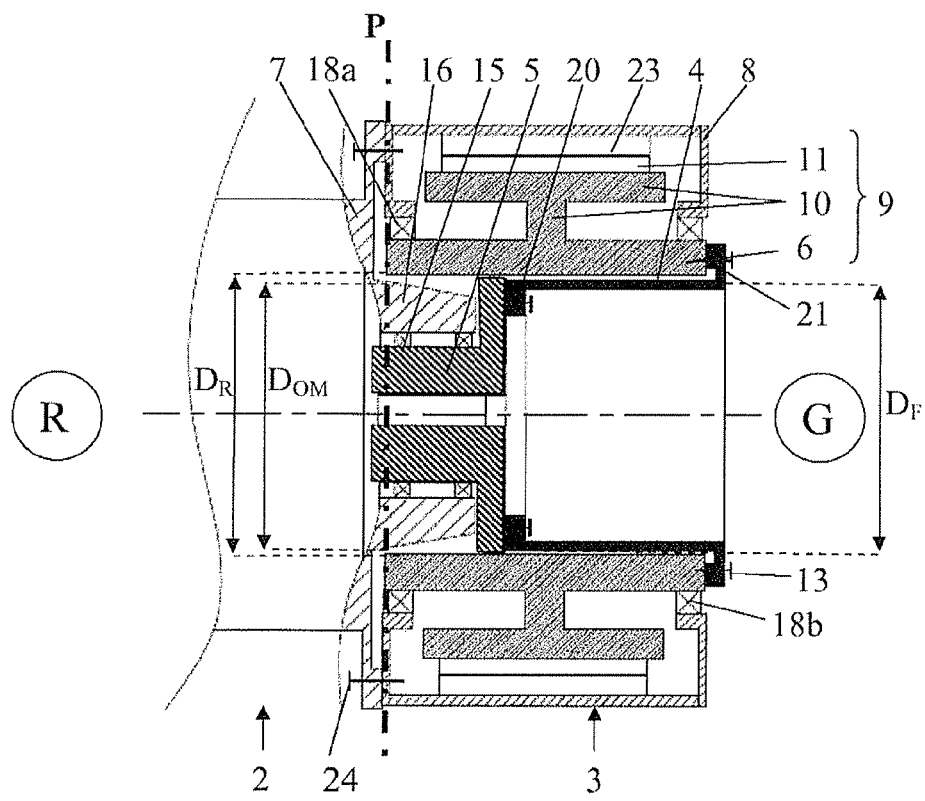
Figure 6:
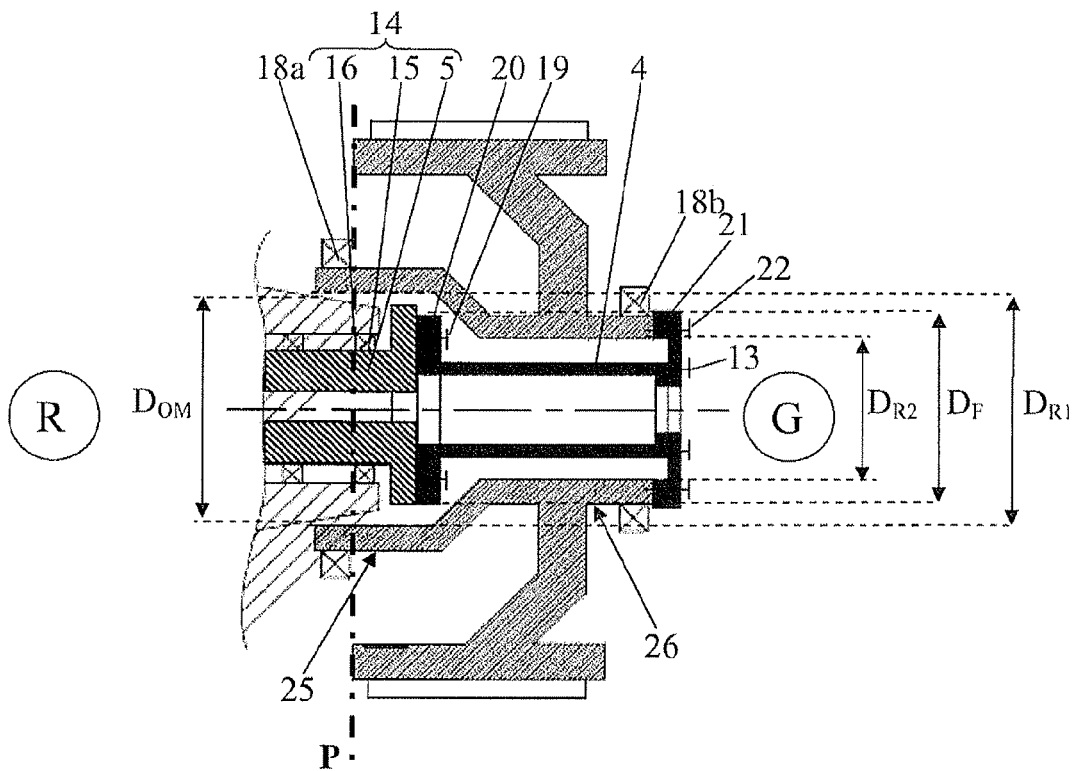

A second embodiment of a drive train 1 according to the invention is described with respect to FIG. 5 and FIG. 6. According to this embodiment, the gearbox output module 14 comprising the gearbox output shaft 5, gearbox output shaft bearing arrangement 15 and gearbox output shaft bearing housing 16, may at least partly extend into the generator rotor shaft 6.

A first implementation of this embodiment is illustrated in FIG. 5. According to this embodiment, the diameter $D_R$ of the rotor shaft 6 may, in case of the gearbox output module 14 having a conical shape, be larger than the largest diameter $D_{OM}$ of the part of the gearbox output module 14 that extends into the generator 3. In case of the gearbox output module 14 having a cylindrical shape, the diameter $D_R$ of the rotor shaft 6 may be larger than the diameter of the gearbox output module 14. In other words, the diameter $D_R$ of the rotor shaft 6 is such that at least part of the gearbox output module 14 fits into it.

In the present embodiment, a first rotor bearing 18a is located at a first end of the generator rotor shaft 6 closest to the gearbox 2 and a second rotor shaft bearing 18b is located at a second end of the generator rotor shaft 6 furthest away from the gearbox 2.

The gearbox output shaft 5 is coupled to the generator rotor shaft 6 via coupling 4. The coupling 4 extends through the generator rotor shaft 6 and is at one side fixed to the gearbox output shaft 5 by means of flange 20 which is integrally formed with the coupling 4 and which has an outer diameter $D_F$ smaller than the diameter $D_R$ of the generator rotor shaft 6. The flange 20 may be connected to the gearbox output shaft 5 via, for example, bolted connection 19. At the other side the coupling 4 is fixed to the generator rotor shaft 6 by means of a flange 21 that is integrally formed with the coupling 4 and which may be connected to the generator rotor shaft 6 via, for example, bolted connection 13.

In the embodiment as illustrated in FIG. 5, the coupling 4 may be hollow and may have a diameter such that it fits into the rotor shaft 6 of the generator 3. Hence, the bolts 19 which connect the coupling 4 to the gearbox output shaft 5 are accessible from the inside of the coupling 4. An advantage hereof is that the coupling 4 can be removed from the drive train 1 without having to disconnect the generator 3 from the gearbox 2 and remove it first. Hence, the coupling 4 is completely demountable from the drive train 1 while the gearbox 2 and generator 3 are connected together by their housings 7, 8. With completely demountable is meant that the coupling 4 as a whole can be removed from the drive train 1 without first having to disconnect and remove the generator 3 from the gearbox 2 by disconnecting their housings 7, 8.

FIG. 6 illustrates a second implementation of the second embodiment of a drive train 1 according to the invention. According to this implementation, the generator rotor shaft 6 may have a first part 25 and a second part 26. The first part 25 has a first inner diameter $D_{R1}$. The second part 26 has a second inner diameter $D_{R2}$. The first inner diameter $D_{R1}$ is larger than the second inner diameter $D_{R2}$ and is larger than the largest diameter $D_{OM}$ of the part of the gearbox output module 14 that extends into the generator 3.

In the example given in FIG. 6, one rotor bearing 18a may be located on the first part 25 of the generator rotor shaft 6 and a second rotor bearing 18b may be located on the second part 26 of the generator rotor shaft 6.

The gearbox output shaft 5 is coupled to the generator rotor shaft 6 via coupling 4. The coupling 4 extends through the generator rotor shaft 6. At one side the coupling 4 may be fixed to the gearbox output shaft 5 by means of flange 20 which has an outer diameter $D_F$ which is smaller than the diameter $D_{R1}$ of the first part 25 of the generator rotor shaft 6 and larger than the diameter $D_{R2}$ of the second part 26 of the generator rotor shaft 6. This flange 20 of the coupling 4 may be connected to the gearbox output shaft 5 by means of e.g. bolted connection 19. At the other side the coupling 4 is fixed to the generator rotor shaft 6 by means of flange 21. In the example given the flange 21 is formed as a separate flange 21, i.e. it is not formed as an integral of the coupling 4. The flange 21 may be connected to the coupling 4 by means of bolted connection 22 and may be connected to the generator rotor shaft 6 by means of bolted connection 13.

As known by a person skilled in the art, the generator 3 may furthermore comprise a stator 23 which may be fixed to the generator housing 8 (not shown in FIG. 6).

Again, similar as for the embodiments described with respect to FIG. 3 and FIG. 4, the gearbox 2 and generator 3 are formed as separate entities. This means that the gearbox 2 and the generator 3 each have their own housing 7, 8. The generator housing 8 is directly connected to the gearbox housing 7. This may, for example, be done by means of bolted connection 24. Furthermore, this means that the gearbox output shaft 5 and the generator rotor shaft 6 each have their own bearing assembly, respectively gearbox output shaft bearings 15 and generator rotor shaft bearings 18a, 18b. According to embodiments of the invention, the gearbox output shaft bearings 15 and generator rotor shaft bearings 18a, 18b may comprise any suitable bearing assembly as known by a person skilled in the art.

Furthermore, the gearbox output module 14 extends into the generator 3 whereby this gearbox output module 14 partly extends beyond plane P defined by an axial surface of a rotating part of the generator 3 first encountered in a direction going from the gearbox 2 towards the generator 3 (as indicated by arrow 12 in FIG. 2a and FIG. 2b). In the embodiments illustrated in FIG. 5 and FIG. 6, the plane P is defined by the front surface of the generator rotor shaft 6, which in the present case is the first rotating part of the generator 3 that is encountered when going in the direction from gearbox 2 towards the generator 3.

In the examples illustrated in FIG. 5 and FIG. 6, the gearbox housing 7 and the output shaft bearing housing 16 are formed as one piece. However, according to other embodiments of the invention, the gearbox housing 7 and the output shaft bearing housing 16 may also be formed as different pieces.

According to embodiments of the invention, the coupling 4 may be formed of an insulating material. The insulating material may be any suitable material known by a person skilled in the art. An advantage of the coupling 4 being formed of an insulating material is that the rotor 9 and stator 23 of the generator 3 is isolated from the rest of the drive train 1, or in other words from the gearbox 2. In that way, stray current from are short-cut by the gearbox and thus no electrical transfer occurs between the generator 3 and the rest of the drive train 1.

Figure 7:
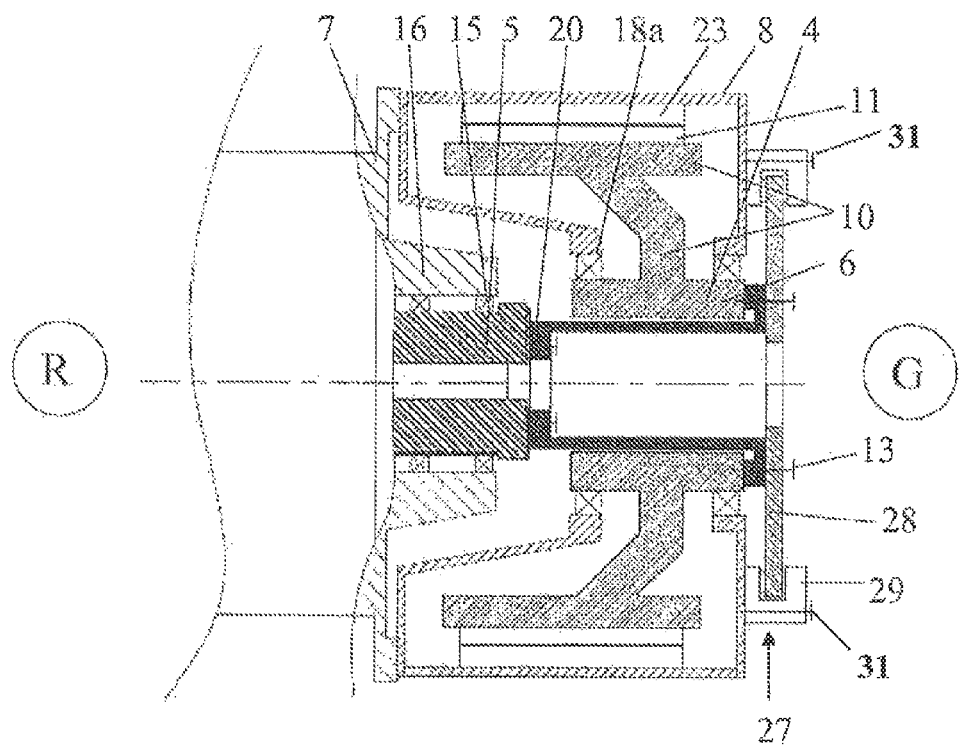

According to embodiments of the invention, a drive train 1 according to any of the examples described above may furthermore comprise a brake assembly. This is illustrated in FIG. 7. The brake assembly 27 may comprise a brake disc 28 and callipers 29. According to embodiments of the invention, the brake disc 28 may be fixed to an end of the coupling 4 furthest away from the gearbox 2 by means of e.g. bolted connection 13. The callipers 29 may be fixed to a static part of the generator housing 8 by means of e.g. bolted connection 31.

According to embodiments of the invention, the gearbox 2 may be a gearbox with a coaxial design. For example, the gearbox 2 may comprise at least one planetary stage 31 or may be comprise at least one differential gear stage, or any other coaxial design known by a person skilled in the art.

Figure 8:
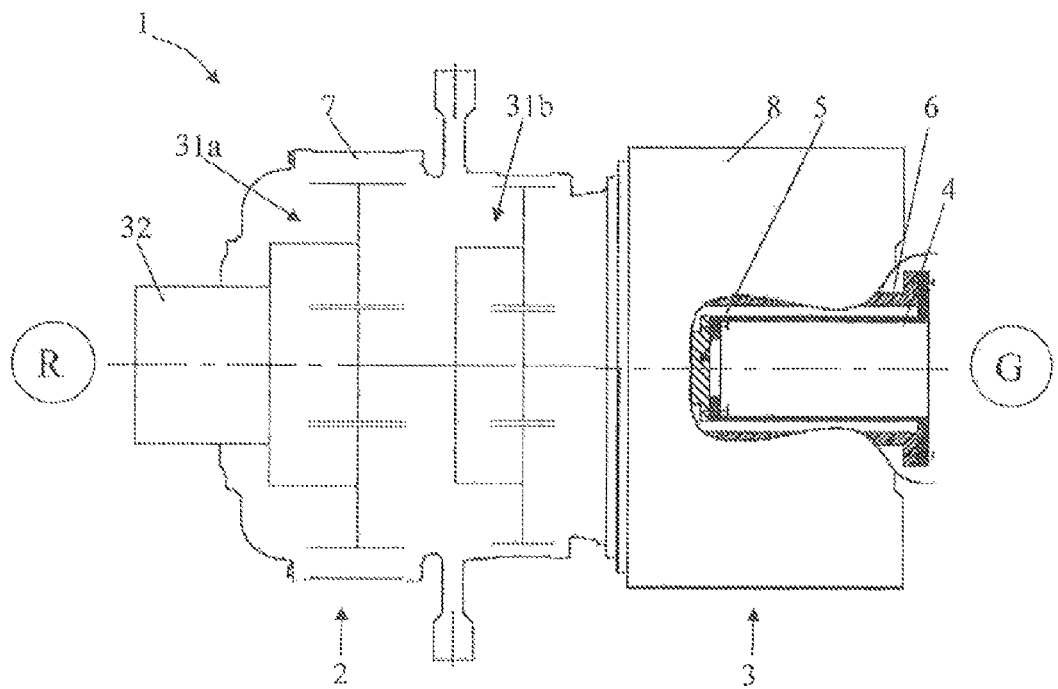
FIG. 8 illustrates a drive train according to an embodiment of the invention.

FIG. 8 illustrates a drive train 1 comprising an embodiment of the innovative concept of the present invention. It has to be understood that this is only for the purpose of illustration and is not intended to limit the invention in any way. In the example given in FIG. 8, the gearbox 2 may comprise an input shaft 32 and two planetary stages 31a and 31b.

Furthermore, according to embodiments of the invention, the generator 3 may be any suitable generator as known by a person skilled in the art.

The invention claimed is:

1. A drive train (1) for a wind turbine, the drive train (1) comprising:
    a gearbox (2),
    a generator (3), and
    a coupling (4) located between an output shaft (5) of the gearbox (2) and a rotor shaft (6) of the generator (3),
    wherein the gearbox (2) and the generator (3) are independent and separate components, and the gearbox (2) and the generator (3) each have their own housing (7, 8),
    the coupling (4) being a separate component which is at least partially removable so as to disconnect the output shaft (5) from the rotor shaft (6),
    the output shaft (5) of the gearbox (2) is supported by a gearbox output shaft bearing arrangement (15) and the rotor shaft (6) of the generator (3) is supported by a generator rotor shaft bearing arrangement (18a, 18b),
    the housing (8) of the generator (3) is directly connected to the housing (7) of the gearbox (2),
    a gearbox output module (14) comprises an end portion of the output shaft (5), the gearbox output shaft bearing arrangement (15) and an end portion of an output shaft bearing housing (16),
    the gearbox output module (14) at least partly extends into the generator (3) and at least partly extends beyond a plane (P) defined by an axial surface of a rotating part of the generator (3) that is first encountered in a direction going from gearbox (2) to generator (3), and
    the coupling (4) extends through a center of the rotor shaft (6) of the generator (3) and is coupled to the rotor shaft (6), from a generator side (G) of the drive train (1) toward the gearbox (2).

2. The drive train (1) according to claim 1, wherein the generator (3) comprises a rotor (9) and a stator (23), the rotor (9) comprises the rotor shaft (6) and a structure (10) carrying active elements (11) of the generator (3), and the plane (P) is defined by a front surface of the structure (10) carrying the active elements (11) of the generator (3).

3. The drive train (1) according to claim 2, wherein
    the gearbox output module (14) at least partly extends into a cavity (17) in the generator housing (8), the cavity (17) has an axial dimension (LAX), a first diameter (D1) and a second diameter (D2), the first diameter (D1) is equal to or smaller than the second diameter (D2), the first diameter (D1) is larger than an end of the output module (14) closest to the generator (3), and the second diameter (D2) is larger than the largest diameter (DOM) of the part of the gearbox output module (14) extending into the generator (3), and
    the rotor shaft (6) of the generator (3) is located at a distance equal to the axial dimension (LAX) from a location where the generator housing (8) is connected to the gearbox housing (7).

4. The drive train (1) according to claim 3, wherein the rotor shaft (6) has an inner diameter (DR), the coupling (4) is connected to the output shaft (5) via a first flange (20) which has an outer diameter (DF) which is smaller than the inner diameter (DR) of the rotor shaft (6).

5. The drive train (1) according to claim 4, wherein the coupling (4) is connected to the rotor shaft (6) via a second flange (21) which is integrally formed with the coupling (4) and is connected to the rotor shaft (6) via at least one bolted connection (13).

6. The drive train (1) according to claim 3, wherein the output shaft (5) is completely disconnected from the rotor shaft (6) when the coupling (4) is removed from the drive train.

7. The drive train (1) according to claim 3, wherein at least one bolt connects the coupling (4) to the output shaft (5) and at least one bolt connects the coupling (4) to the rotor shaft (6).

8. The drive train (1) according to claim 1, wherein the axial surface of the rotating part of the generator (3) comprises a front surface of the rotor shaft (6) so that the plane (P) is defined by the front surface of the rotor shaft (6) of the generator (3).

9. The drive train (1) according to claim 8, wherein the gearbox output module (14) at least partly extends into the rotor shaft (6) of the generator (3).

10. The drive train (1) according to claim 9, wherein the rotor shaft (6) has an inner diameter (DR), and the inner diameter (DR) of the rotor shaft (6) is larger than the largest diameter (DOM) of the part of the gearbox output module (14) extending into the generator (3).

11. The drive train (1) according to claim 9, wherein the rotor shaft (6) has a first part (25) with a first inner diameter (DR1) at an end of the generator (3) closest to the gearbox (2), and a second part (26) with a second inner diameter (DR2) at an end of the generator (3) furthest away from the gearbox (2), the first inner diameter (DR1) is larger than the second inner diameter (DR2) and is larger than the largest diameter (DOM) of the part of the gearbox output module (14) that extends into the generator (3).

12. The drive train (1) according to claim 11, wherein a first rotor shaft bearing (18a) is located at the first part (25) of the rotor shaft (6) and a second rotor shaft bearing (18b) is located at the second part (26) of the rotor shaft (6).

13. The drive train (1) according to claim 4, wherein a first rotor shaft bearing (18a) is located at a side of the rotor shaft (6) closest to the gearbox (2) and a second rotor shaft bearing (18b) is located at a side of the rotor shaft (6) furthest away from the gearbox (2).

14. The drive train (1) according to claim 1, wherein the coupling (4) is hollow and is connected to the output shaft (5) by bolts (19) which are accessible from the inside of the coupling (4).

15. The drive train (1) according to claim 1, wherein the coupling (4) is formed of an electrically insulating material for isolating the output shaft (5) from a remainder of the drive train.

16. The drive train (1) according to claim 1, wherein the drive train (1) further comprises a brake assembly (27) which comprises a brake disc (28) and calipers (29), the brake disc (28) is fixed to an end of the coupling (4) furthest away from the generator (3) and the calipers (29) are fixed to a static part of the generator housing (8).

17. The drive train (1) according to claim 1, wherein the gearbox (2) is of a coaxial design.

* * * * *